(No Model.)
J. WOODALL.
WINDOW OR SKYLIGHT OPERATOR.
No. 561,848. Patented June 9, 1896.
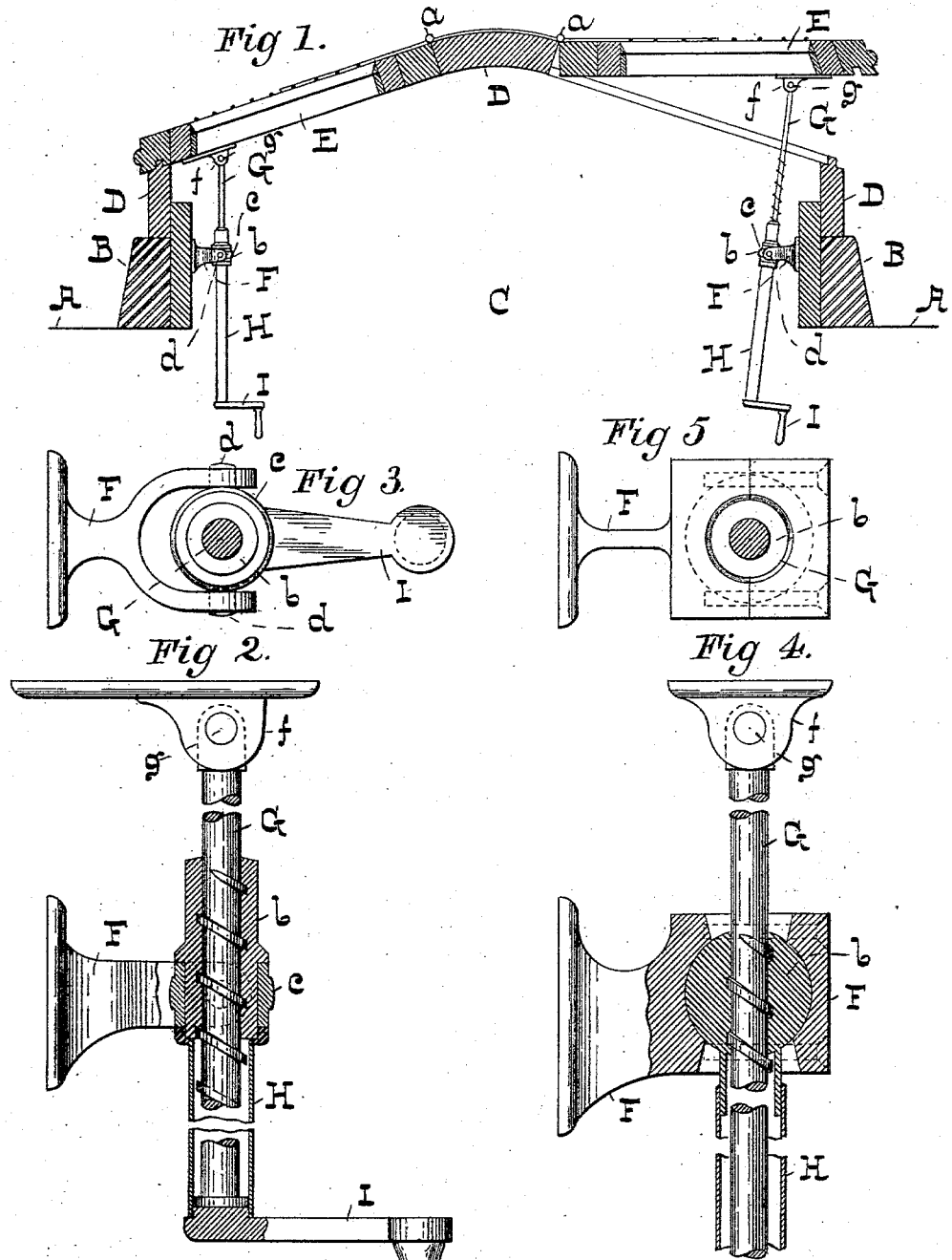
WITNESSES
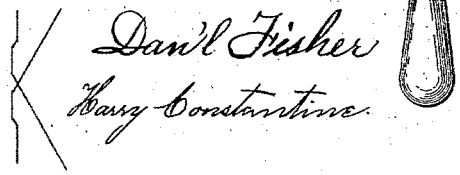
INVENTOR
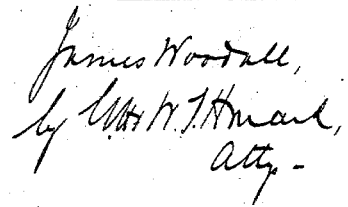

UNITED STATES PATENT OFFICE.

JAMES WOODALL, OF BALTIMORE, MARYLAND.

WINDOW OR SKYLIGHT OPERATOR.

SPECIFICATION forming part of Letters Patent No. 561,848, dated June 9, 1896.

Application filed November 25, 1895. Serial No. 570,003. (No model.)

*To all whom it may concern:*

Be it known that I, JAMES WOODALL, of the city of Baltimore and State of Maryland, have invented certain Improvements in Devices for Operating the Sash of Skylights of Vessels, of which the following is a specification.

In the description of the said invention which follows reference is made to the accompanying drawings, forming a part hereof, in which—

Figure 1 is a cross-section of a skylight embodying the invention. Figs. 2 and 3 are enlarged views of the invention, with parts thereof in section. Figs. 4 and 5 illustrate a modification in the construction of the invention.

Referring now to the drawings, A is the deck-line of a vessel, and B the coaming around the skylight-opening or hatch C.

D is the framework of the skylight, erected on the coaming B.

E E are the glazed sash, hinged to the frame D at $a$.

F is a forked bracket secured to the inner face of the frame D, carrying a revoluble nut $b$, around which is a collar $c$, having trunnions $d$, resting loosely in holes in the forked bracket F.

G is a threaded stem which passes through the nut $b$ and is at its upper end attached, by means of a stand $f$ and a pin $g$, to the sash E. To the lower end of the nut is fastened a sleeve H, having a crank-handle I, by means of which the nut is turned to open or close the skylight. The lower end of the stem G rests on the crank-handle I when the skylight is closed, and in the turning of the handle in a direction to open the skylight the said end leaves the handle.

It will be seen that the nut $b$ accommodates itself to any position required by a change in the angle of the stem. (See Fig. 1, in which one sash is shown as open and the other closed.)

In Figs. 4 and 5 the nut $b$ is spherical and partially inclosed by the bracket F, which is in two parts connected by screws. In the operation of this modified construction the nut is revolved in the bracket and also turns to adjust itself to the angle assumed by the stem in a manner substantially the same as that of the nut illustrated in Figs. 1, 2, and 3.

I claim as my invention—

In combination with a hinged skylight, a threaded stem jointed thereto, a bracket rigidly attached to some stationary object, a revoluble nut supported by the bracket which is susceptible of angular adjustment independently of the said bracket, through which the threaded stem passes, and means to revolve the said nut and thereby operate the hinged skylight, substantially as specified.

JAMES WOODALL.

Witnesses:
 WM. T. HOWARD,
 DANL. FISHER.